United States Patent
Maeda

(10) Patent No.: US 8,306,411 B2
(45) Date of Patent: Nov. 6, 2012

(54) PHOTOGRAPHIC APPARATUS

(75) Inventor: Hirokazu Maeda, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 203 days.

(21) Appl. No.: 12/538,897

(22) Filed: Aug. 11, 2009

(65) Prior Publication Data

US 2010/0040359 A1 Feb. 18, 2010

(30) Foreign Application Priority Data

Aug. 13, 2008 (JP) .................................. 2008-208497

(51) Int. Cl.
*G03B 7/08* (2006.01)
(52) U.S. Cl. ........................................ 396/106; 396/231
(58) Field of Classification Search .................... 396/231
See application file for complete search history.

(56) References Cited

U.S. PATENT DOCUMENTS

| | | | | |
|---|---|---|---|---|
| 5,606,391 | A * | 2/1997 | Aoki et al. | 396/48 |
| 6,792,203 | B1 * | 9/2004 | Ide et al. | 396/65 |
| 2005/0168611 | A1 | 8/2005 | Yamaya | |
| 2005/0270399 | A1 | 12/2005 | Kawaguchi et al. | |
| 2006/0140616 | A1 * | 6/2006 | Kuruma | 396/165 |
| 2008/0024624 | A1 * | 1/2008 | Okamoto | 348/229.1 |
| 2008/0037975 | A1 * | 2/2008 | Nakajima | 396/104 |
| 2008/0089677 | A1 * | 4/2008 | Lim | 396/213 |
| 2009/0066807 | A1 * | 3/2009 | Miyanishi | 348/231.2 |
| 2009/0217315 | A1 * | 8/2009 | Malik et al. | 725/9 |
| 2009/0245770 | A1 | 10/2009 | Uenaka | |
| 2009/0245771 | A1 | 10/2009 | Uenaka | |
| 2009/0245773 | A1 | 10/2009 | Uenaka | |
| 2009/0245774 | A1 | 10/2009 | Uenaka | |
| 2009/0251551 | A1 | 10/2009 | Uenaka | |

FOREIGN PATENT DOCUMENTS

| | | |
|---|---|---|
| JP | 2004-61762 | 2/2004 |
| JP | 2005-217861 | 8/2005 |
| JP | 2005-348181 | 12/2005 |

OTHER PUBLICATIONS

English language Abstract of JP 2005-348181, Dec. 15, 2005.
U.S. Appl. No. 12/538,895 to MAEDA, filed on Aug. 11, 2009.
U.S. Appl. No. 12/538,894 to MAEDA, filed on Aug. 11, 2009.
English language Abstract of JP 2005-217861, Aug. 11, 2005.
Japanese Office Action, dated Apr. 24, 2012, along with an English language translation thereof.

* cited by examiner

*Primary Examiner* — Clayton E LaBalle
*Assistant Examiner* — Dennis Hancock
(74) *Attorney, Agent, or Firm* — Greenblum & Bernstein, P.L.C.

(57) ABSTRACT

A photographic apparatus comprises an information obtaining unit and a controller. The information obtaining unit obtains information regarding a photographic subject image. The controller performs a switching control that changes a first use mode to a second use mode on a basis of the information. The first use mode is set by a user, and the second use mode is different from the first use mode.

20 Claims, 5 Drawing Sheets

PHOTOGRAPHIC APPARATUS

BACKGROUND OF THE INVENTION

1. Field of the Invention

The present invention relates to a photographic apparatus, and in particular, to a switching control that switches its use mode in accordance with a photographic subject image.

2. Description of the Related Art

A photographic apparatus whose use mode, (such as flash mode, capture mode, etc.), is selectable, in a manner as that of Japanese unexamined patent publication (KOKAI) No. 2005-348181, is what is here proposed.

However, there exists the problem that the mode selected for use may be inappropriate.

As an example, consider the case in day light, when the photographic subject image is bright, if the flash mode of the photographic apparatus is set to the Flash-On mode that discharges the flash with each photographic operation, the flash will fire even if the flash is not necessary.

SUMMARY OF THE INVENTION

Therefore, an object of the present invention is to provide a photographic apparatus whose use mode can be set appropriately in accordance with the photographic subject image.

According to the present invention, a photographic apparatus comprises an information obtaining unit and a controller. The information obtaining unit obtains information regarding a photographic subject image. The controller performs a switching control that changes a first use mode to a second use mode on a basis of the information. The first use mode is set by a user, and the second use mode is different from the first use mode.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
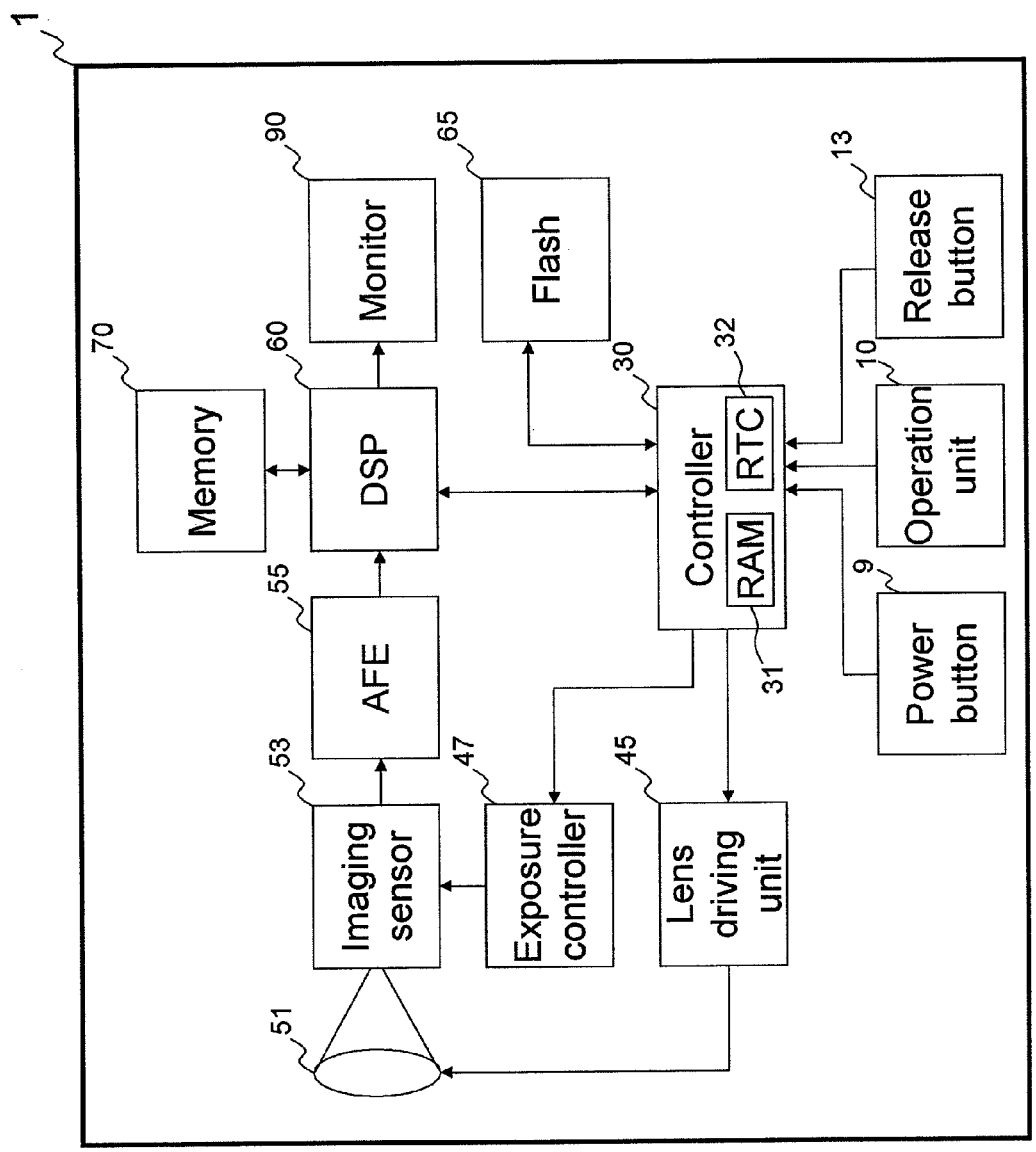
FIG. 1 is a block diagram of the photographic apparatus in the present embodiment.

The present invention is described below with reference to the embodiment shown in the drawings. In the embodiment, the photographic apparatus 1 is a digital camera.

The imaging part of the photographic apparatus 1 comprises a power button 9 that is used for switching between the ON/OFF states of the photographic apparatus 1, an operation unit 10, a release button 13, a controller 30 that controls each part of the photographic apparatus 1, a lens driving unit 45, an exposure controller 47, a lens 51, an imaging sensor 53 such as a CCD etc., an AFE (Analog Front End) 55, a DSP (an image signal-processing circuit) 60, a flash 65, a memory 70, and a monitor 90 (see FIG. 1).

The photographic subject image is captured as an optical image through the lens 51 by the imaging sensor 53, in a photographic operation.

A/D conversion on the image data obtained by the photographic operation is performed by the AFE 55 and image-processing on the A/D converted image data is performed by the DSP 60.

The photographic operation, A/D conversion, and image-processing, are performed at a predetermined time interval (for example $1/30^{th}$ of a second) so that a through-image based on the image data is displayed on the monitor 90 (in a hereinafter, so called, "live-view indication").

The operation unit 10 is used for setting the use modes of the photographic apparatus 1.

As an example, consider that the operation unit 10 may be used for selecting a flash mode from among the plurality of use modes. Such flash mode may include one of: a Flash-On mode, (that discharges the flash 65 with each photographic operation); an Auto-Discharge mode, (that discharges the flash 65 automatically in dark or backlit locations, based on a photometric result); and a Flash-Off mode, (that does not discharge the flash 65 with each photographic operation). The flash mode is selected using the operation unit 10.

Furthermore, the operation unit 10 may be used for selecting a capture mode from among the plurality of use modes. Examples of capture modes include: a Program-AE mode (or Auto-Picture mode), a Night-Scene mode, and other capture modes, all selectable by the operation unit 10.

In the Program-AE mode (or the Auto-Picture mode), the exposure condition (including the shutter speed, aperture, etc.), is automatically calculated based on the results of a photometric reading.

In the Night-Scene mode, program line and ISO sensitivity are optimized for shooting night scene shots.

Information regarding the use modes set by the user using the operation unit 10, is stored in RAM 31 etc., in the controller 30 and is read out when the photographic apparatus 1 is set to the ON state.

When the release button 13 is partially depressed by the user, the photometric switch (not depicted) changes to the ON state so that the photometric operation is performed by an AE sensor (not depicted), and the AF sensing operation and the focusing operation are performed by the lens driving unit 45.

The photometric operation is performed on the basis of the image data obtained in the photographic operation by the imaging sensor 53.

Specifically, the DSP 60 calculates a luminance value (i.e., information regarding the luminance of the photographic subject image) for a photometric area based on a luminance signal generated in the image processing. Then, the DSP 60 outputs that value to the controller 30 as the photometric result.

The controller 30 calculates appropriate exposure values including an aperture value and a shutter speed, on the basis of the calculated luminance value (i.e., ex posure calculation).

Furthermore, when the photographic apparatus 1 is set to the Auto-Discharge mode, the controller 30 determines whether it is necessary to discharge the flash 65 in the photographic operation, on the basis of the calculated luminance value, as well as on the exposure calculation.

When the release button 13 is fully depressed by the user, the release switch changes to the ON state so that the photographic operation will be performed with the exposure controller 47 controlling the aperture and shutter based on the aperture value and the shutter speed calculated by the controller 30. The captured image corresponding to the image data is displayed on the monitor 90 and the image data is stored in the memory 70.

Furthermore, in the embodiment, the photometric operation is also performed after the photographic apparatus 1 is set to the ON state and before the release button 13 is partially depressed, and an optimization of the use modes is performed on the basis of the photometric result, etc.

Specifically, when the power button 9 is operated such that the photographic apparatus 1 is set to the ON state, the photometric operation is then performed. The DSP 60 (an information obtaining unit) obtains information regarding the luminance of the photographic subject image. Then, the DSP 60 outputs that information to the controller 30 as a photometric result.

The controller 30 obtains time information from an RTC (Real Time Clock) 32 provided and set within the controller 30. The time information may include information regarding the current time.

On the basis of the luminance and time information, the controller 30 determines whether the photographic subject image is bright and whether the current time is nighttime.

When the controller 30 determines that the photographic subject image is bright and that the current time is not nighttime, and when the photographic apparatus 1 is set to the Flash-On mode or the Night-Scene mode, it is determined that the currently-selected use mode is inappropriate for the current photographic operation by the controller 30. Afterwards, the use mode (i.e., the Flash-On mode or the Night-Scene mode) selected by the user is changed to another use mode.

Specifically, the Flash-On mode is changed to the Auto-discharge mode, and the Night-Scene mode is changed to either the Program-AE mode or the Auto-Picture mode.

Figure 2:
FIG. 2 is a flowchart that shows a process which occurs when the photographic apparatus is set to the ON state.

Next, the process after the photographic apparatus 1 is set to the ON state is explained using the flowchart of FIG. 2. When the user operates the power button 9 so that the photographic apparatus 1 is set to the ON state, the lens driving unit 45 moves the lens 51 to a predetermined position for photographic operation, in step S11.

In step S12, on the basis of the image data, the through-image is displayed on the monitor 90.

In step S13, the photometric operation is performed. The DSP obtains the information regarding the luminance of the photographic subject image and then outputs it to the controller 30 as the previously-mentioned photometric result. That photometric result is used for switching the capture mode and the flash mode.

In step S14, the controller 30 obtains the time information from the RTC 32.

In step S15, the controller 30 reads out the information regarding the previously-set use modes, (such as the capture mode and the flash mode), stored in RAM 31.

In step S16, the controller 30 performs a first-switching control of the capture mode, on the basis of the photometric result obtained in step S13. The details of the first-switching control are described later, using the flowchart of FIG. 3.

In step S17, the controller 30 performs a second-switching control of the flash mode, on the basis of the photometric result obtained in step S13. The details of the second-switching control are described later using the flowchart of FIG. 4.

In step S18, icons etc., are displayed on the monitor 90. When the capture mode is changed in step S16 or the flash mode is changed in step S17, it is desirable to display that the mode change is performed on the monitor 90 in order to inform to the user.

In step S19, the controller 30 determines whether the movement of the lens 51 to the predetermined position is complete. When the controller 30 determines that the movement is not complete, the operation in step S19 is repeated. Otherwise, the operation continues to step S20.

In step S20, the photographic apparatus 1 is set to a waiting state that enables normal operations, such as the operation of the release button 13, etc. Then, the user mode is stored in RAM 31 (step S20A) and the start-up operation is completed.

Figure 3:
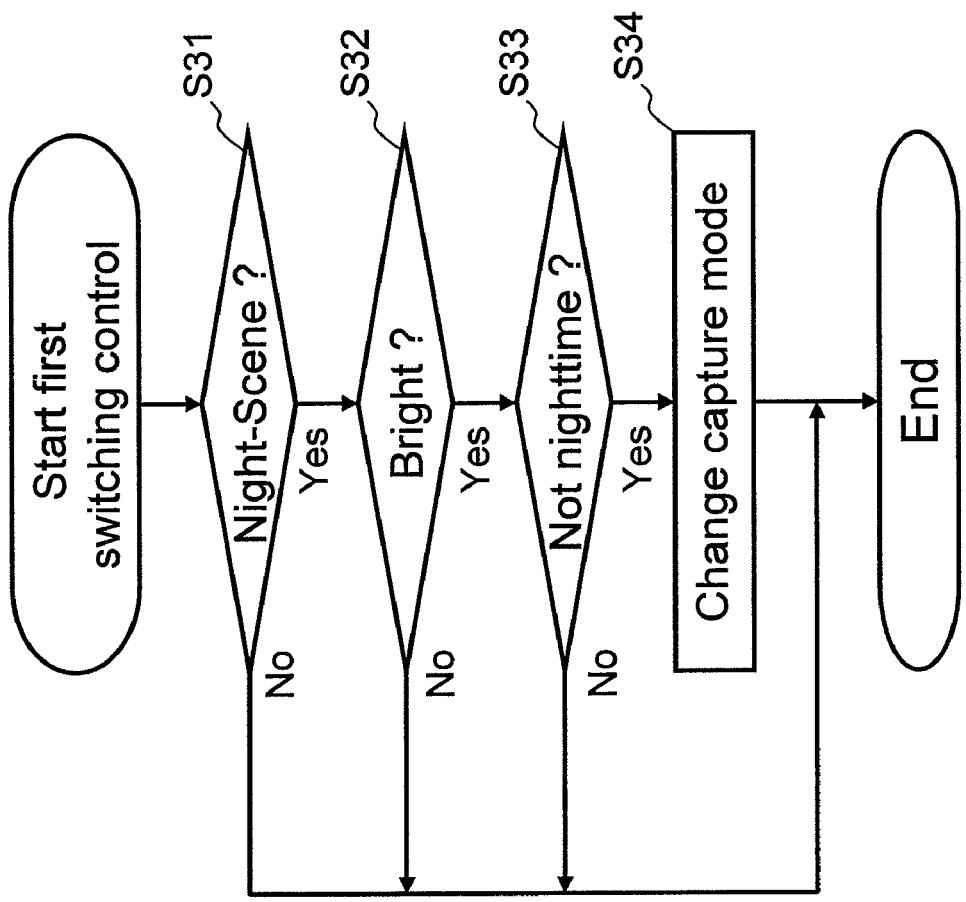
FIG. 3 is a flowchart that shows a first-switching control of the hereinafter referred-to "capture mode"

Next, the process of the first-switching control of the capture mode is explained using the flowchart of FIG. 3.

In step S31, it is determined whether the capture mode of the photographic apparatus 1 is set to the Night-Scene mode.

When it is determined that the capture mode of the photographic apparatus 1 is set to the Night-Scene mode, the operation continues to step S32. Otherwise, the operation terminates without change of the capture mode.

In step S32, the controller 30 determines whether the photographic subject image is bright enough on the basis of the photometric result. Specifically, the controller 30 determines whether the luminance value of a predetermined area (such as the photometric area, etc.), is greater than a given threshold.

When the controller 30 determines that the photographic subject image is sufficiently bright, the operation continues to step S33. Otherwise, the operation terminates without change of the capture mode.

In step S33, the controller 30 determines whether the current time is not nighttime, on the basis of the time information.

When the controller 30 determines that the current time is not nighttime the operation continues to step S34. Otherwise, the operation terminates without change of the capture mode.

In step S34, the controller 30 changes the capture mode from the Night-Scene mode to the Program-AE mode, or to the Auto-Picture mode.

Then, this switched capture mode (the Night-Scene mode or the Program-AE mode) is maintained until the user operates the operation unit 10 to select another capture mode.

Figure 4:
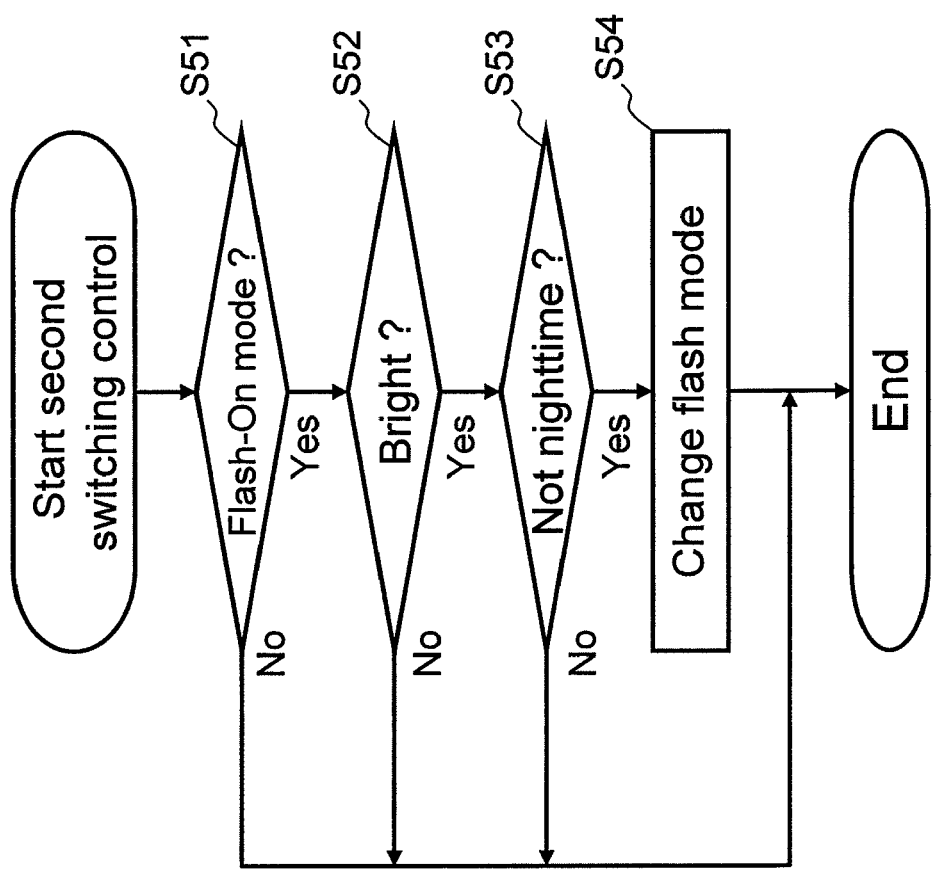
FIG. 4 is a flowchart that shows a second-switching control of the flash mode.

Next, the process of the second-switching control of the flash mode is explained using the flowchart of FIG. 4.

In step S51, it is determined whether the flash mode of the photographic apparatus 1 is set to the Flash-On mode.

When it is determined that the flash mode of the photographic apparatus 1 is set to the Flash-On mode, the operation continues to step S52. Otherwise, the operation terminates without change of the flash mode.

In step S52, the controller 30 determines whether the photographic subject image is sufficiently bright on the basis of the photometric result. Specifically, the controller 30 determines whether the luminance value of a predetermined area (such as the photometric area, etc.), is greater than a given threshold.

When the controller 30 determines that the photographic subject image is sufficiently bright, the operation continues to step S53. Otherwise, the operation terminates without change of the flash mode.

In step S53, the controller 30 determines whether the current time is not nighttime, on the basis of the time information.

When the controller 30 determines that the current time is not nighttime the operation continues to step S54. Otherwise, the operation terminates without change of the flash mode.

In step S54, the controller 30 changes the flash mode from the Flash-On mode to the Auto-Discharge mode.

Then, this switched flash mode (the Auto-Discharge mode) is maintained until the user operates the operation unit 10 to select another flash mode.

When the capture mode of the photographic apparatus 1 is set to the Night-Scene mode, the exposure control is performed in accordance with the program line written so as to optimally shoot a dark photographic subject image. In such case, a relatively slow shutter speed is chosen. Therefore, the photographic operation may be performed with needlessly slow shutter speed, even if the current time is daytime and the photographic subject image is bright.

Furthermore, the captured image data is stored in the memory 70 with information attached indicating that the photographic operation was performed in the Night-Scene mode.

When the flash mode of the photographic apparatus 1 is set to the Flash-On mode, the photographic operation with flash is performed each time, regardless the brightness of the photographic subject image. For discharging the flash 65, charging is performed before photographic operation so that electrical power is needlessly consumed.

Accordingly, when it is daytime and the photographic subject image is bright, performing the photographic operation in the capture mode (the Night-Scene mode) or in the flash mode (the Flash-On mode) may not always be appropriate.

In the embodiment, under the above-described condition considering daytime and a bright photographic subject image, it is determined that the photographic operation should be performed in the set use mode (i.e., the Night-Scene mode or the Flash-On mode). Then, the controller 30 performs the switching control for changing the use mode set by the user to a more appropriate use mode. Specifically, the controller 30 performs the first-switching control in order to change the capture mode (i.e., the Night-Scene mode) set by the user, to another more appropriate capture mode (i.e., the Program-AE mode or the Auto-Picture mode), or performs the second-switching control in order to change the flash mode (i.e., the Flash-On mode) to another more appropriate flash mode (i.e., the Auto-Discharge mode). Finally, the photographic operation with the switched use mode is performed.

In the embodiment, as in the example of switching the use mode of the photographic apparatus 1, switching the capture mode from the Night-Scene mode to the Program-AE mode etc., and switching the flash mode from the Flash-On mode to the Auto-Discharge mode are explained.

However, note that switching the use mode on the basis of the information regarding the photographic subject image is not limited to the examples described above.

Figure 5:
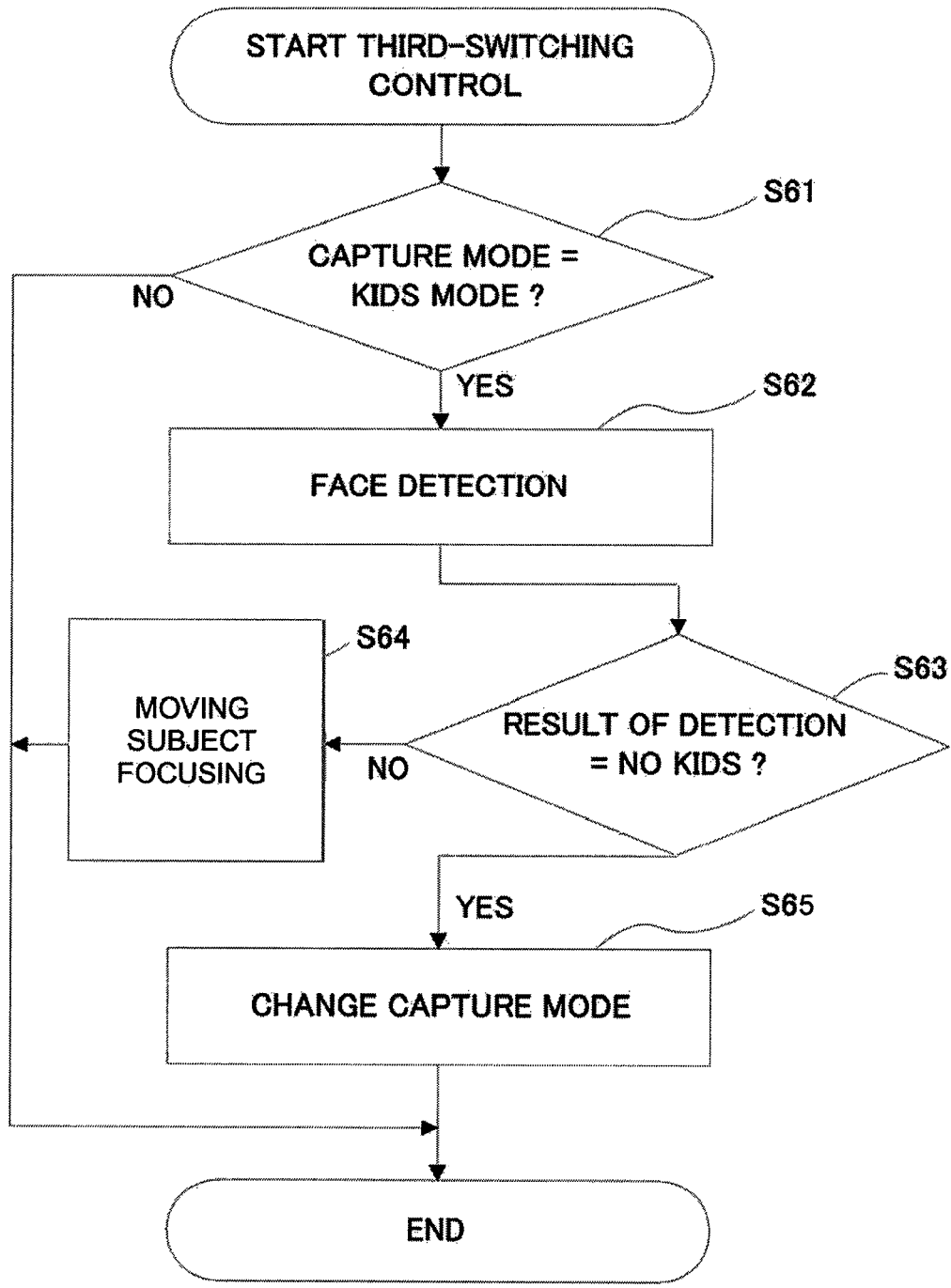
FIG. 5 is a flow chart that illustrates a third-switching control of the capture mode.

For example, as shown in FIG. 5, a third-switching control that changes the capture mode from "Kids mode" to another capture mode is provided. In the so-called "Kids mode" (S61), the focusing operation is performed relative to the movement of a subject, (here, a child). When it is determined that the photographic subject image does not include a child (Yes in S63) through the face detection (S61) capable of discriminating a child from an adult in the photographic subject image, the capture mode is changed from the Kids mode to another more appropriate capture mode within the third-switching control (S65). On the other hand when it is determined that a child is present (No in S63), a moving subject focusing operation (S64) is performed.

In that case, the DSP 60 (an information obtaining unit) includes a face detector. The face detector obtains information regarding a face on the photographic subject image as the information regarding the photographic subject image, and in particular, obtains information that is used for distinguishing an adult from a child. Then, the face detector outputs it to the controller 30.

The controller 30 determines whether the photographic subject image includes a child on the basis of the information described above.

When the controller 30 has determined that the photographic subject image does not include a child, the controller 30 changes the capture mode from the Kids mode to another capture mode that does not perform the focusing operation required to capture a moving person, (i.e., a child), on the photographic subject image.

Furthermore, a fourth-switching control is cited. In the fourth-switching control, capture mode that is used for shooting subjects other than people, (such as Landscape mode), is changed to another capture mode.

In that case, the DSP 60 (an information obtaining unit) also includes a face detector. The face detector obtains information regarding a face on the photographic subject image as the information regarding the photographic subject image. Then, the face detector outputs it to the controller 30.

The controller 30 determines whether there is a face detected in the vicinity of the center of the photographic subject image and determines whether the ratio of area of that face relative to the photographic subject image is large, on the basis of the information described above.

When the controller 30 has determined that there exists a face in the vicinity of the center of the photographic subject image, or that the ratio of the detected face area on the photographic subject image is large, the controller 30 changes the capture mode (from the Landscape mode) to another capture mode such as the Program-AE mode, etc.

Furthermore, it is explained that switching the use mode of the photographic apparatus 1 is performed when the photographic apparatus 1 is set to the ON state.

However, switching may be performed according to a different timing. For example, switching of the use mode may be performed in the normal photometric operation when the release button 13 is partially depressed.

When the release button 13 is partially depressed, the normal photometric operation is performed. Therefore, switching the use mode of the photographic apparatus 1 can be performed on the basis of the photometric result of the normal photometric operation.

In addition, switching of the use mode may also be performed only when the photographic apparatus 1 is set to the ON state. However, it may also be performed when a predetermined time has passed after the use mode has been manually set by the user, or when predetermined photographic operations have been performed after the use mode has been manually set by the user.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2008-208497 (filed on Aug. 13, 2008), which is expressly incorporated herein by reference, in its entirety.

The invention claimed is:

1. A photographic apparatus comprising:
   an information obtainer that obtains information regarding a photographic subject image; and
   a controller that controls the photographic apparatus based upon a first use mode when power to the photographic apparatus is turned ON, and stores the first use mode in a memory when the power of the photographic apparatus is turned OFF, said controller performs a switching control that changes said first use mode to a second use mode on a basis of the information, said first use mode being set by a user, and said second use mode being different from said first use mode, and being a use mode selected by said controller, based upon the information regarding the photographic subject.

2. The photographic apparatus according to claim 1, wherein said information obtainer obtains information regarding luminance of the photographic subject image on a basis of a photometric result, as said information; and
said controller performs said switching control on a basis of said information and time information.

3. The photographic apparatus according to claim 2, further comprising a flash;
wherein said first use mode is a predetermined flash mode that discharges said flash with each photographic operation.

4. The photographic apparatus according to claim 2, wherein said first use mode is a first predetermined capture mode;
in said first predetermined capture mode, a program line for shooting a night scene is used.

5. The photographic apparatus according to claim 2, said controller including a real-time clock and performing said switching control based upon whether the real-time clock indicates that a current time is night time.

6. The photographic apparatus according to claim 2, wherein, when said controller determines, based on the photometric result, that the luminance of the photographic subject image is bright, and, determines, based on the time information, that the current time is not night time, and when the first use mode set by the user requires flash emission, said controller performs a switching control to switch to a different use mode.

7. The photographic apparatus according to claim 6, further comprising a display, said controller further being configured to display an informational icon on said display when the first use mode is changed to the second use mode.

8. The photographic apparatus according to claim 1, wherein said first use mode is a predetermined capture mode that performs a focusing operation, required to capture a moving person, with respect to the photographic subject image;
said information obtainer performs face detection for the photographic subject image and obtains information regarding a face on the photographic subject image as said information; and
said controller performs said switching control on a basis of said information.

9. The photographic apparatus according to claim 8, further comprising a face detector configured to detect the presence of a face of a child within an imaging area and when the face of a child is not detected, said controller being configured to perform said switching control to select a capture mode that does not perform the focusing operation required to capture a moving person.

10. The photographic apparatus according to claim 8, further comprising a face detector configured to distinguish between a face of a child and a face of an adult.

11. The photographic apparatus according to claim 1, wherein said switching control is performed when said photographic apparatus is set to the ON state.

12. The photographic apparatus according to claim 1, wherein said switching control is performed when a release button of said photographic apparatus is partially depressed.

13. The photographic apparatus according to claim 1, further comprising an operator configured for setting the use modes of the photographic apparatus, the operator being configured to select a flash mode from a plurality of flash modes including a flash-on mode that discharges a flash for each photographic operation, an auto-discharge flash mode that discharges the flash in predetermined situations based upon a result of a photometric operation, and a flash-off mode that does not discharge the flash.

14. The photographic apparatus according to claim 1, further comprising an operator configured for setting the use modes of the photographic apparatus, the operator being configured to select a capture mode from among a plurality of capture modes including a program AE mode in which exposure conditions are calculated based upon a result of a photometric operation and a night scene mode in which a program line and ISO sensitivity are selected to be appropriate for photographing the night scenes.

15. The photographic apparatus according to claim 1, said information obtainer being configured to obtain said information regarding a photographic subject image during a startup operation of the photographic apparatus, without user actuation of a control switch of the photographic apparatus.

16. The photographic apparatus according to claim 1, said switching control comprises a first switching control and a second switching control, said first switching control selecting one of a plurality of capture modes on a basis of a photometric result, said second switching control selecting one of a plurality of flash modes on the basis of the photometric result.

17. The photographic apparatus according to claim 16, said plurality of capture modes including a program AE mode in which exposure conditions are calculated based upon a result of a photometric operation and a night scene mode in which a program line and ISO sensitivity are selected to be appropriate for photographing night scenes.

18. The photographic apparatus according to claim 16, said plurality of flash modes including a flash-on mode that discharges a flash for each photographic operation, an auto discharge flash mode that discharges a flash in predetermined situations based upon a result of a photometric operation, and a flash-off mode that does not discharge the flash.

19. The photographic apparatus according to claim 1, said information obtainer comprising a digital signal processor (DSP).

20. The photographic apparatus according to claim 1, further comprising a display, said controller further being configured to display an informational icon on said display when the first use mode is changed to the second use mode.

* * * * *